Patented Apr. 13, 1937

2,077,064

UNITED STATES PATENT OFFICE 2,077,064

CONDENSATION PRODUCTS OF THE ACRIDINE SERIES

Friedrich Ebel, Mannheim, and Christian Steigerwald, Ludwigshafen-on-the-Rhine, Germany, assignors to General Aniline Works, Inc., New York, N. Y., a corporation of Delaware No Drawing. Application April 11, 1934, Serial No. 720,142. In Germany April 29, 1933

11 Claims. (Cl. 260—36)

The present invention relates to nitrogenous condensation products and a process of producing same.

We have found that valuable nitrogenous condensation products can be obtained by condensing ms-halogenacridines with aromatic compounds having at least one exchangeable hydrogen atom attached to nitrogen and containing at least one keto group, preferably with aromatic compounds containing a primary amino group and at least one keto group. Ms-halogenacridines especially suitable for the condensation are for example 9-chloracridine, 9-bromacridine, ms-chlorphthaloylacridines, ms-chlorphthaloylquinolines (which are obtainable for example by the condensation of alpha-naphthoquinones with ortho-anthranilic acid, ring closure of the resulting naphthoquinonylanthranilic acids with concentrated sulphuric acid to form benzacridonequinones (cf. Hauschka, J. f. pr. Chem. 90, page 451) and conversion of the resulting benzacridonequinones with phosphorus pentachloride or thionyl chloride) or substitution products or homologues of the said compounds. Suitable aromatic compounds are for example aminoanthraquinones, aminobenzanthrones, aminodibenzanthrones, aminopyranthrones, aminoanthanthrones, aminoanthrapyrimidines and aminoanthrapyrimidones and their homologues and substitution products.

The condensation is preferably carried out in the presence of organic diluents, such as nitrobenzene, trichlorobenzene, and if desired agents capable of combining with acids such as calcium carbonate, magnesium carbonate and sodium acetate, or substances promoting the reaction, such as copper compounds, may be added. Instead of starting from ms-halogenacridines themselves, the corresponding acridones may be treated with agents capable of replacing the carbonyl or hydroxyl group by halogen, as for example thionyl chloride, phosphorus pentachloride or phosphorus oxychloride, the condensation with the amino compounds then being effected.

The reaction products may be freed when necessary from any by-products or isomers by crystallization or by treatment with oxidizing agents, such as hypochlorites.

The products obtainable according to the present invention are in part dyestuffs themselves and in part they constitute valuable dyestuff intermediates.

The following examples will further illustrate the nature of this invention but the invention is not restricted to these examples. The parts are by weight.

Example 1

44 parts of 9-chloracridine and 44 parts of 1-aminoanthraquinone are boiled in 800 parts of nitrobenzene until hydrochloric acid gas is no longer evolved. After cooling the whole is filtered by suction and washed with ethyl alcohol. The reaction product is obtained in the form of compact red crystals having a melting point of from 321° to 322° C.

In a similar manner a red crystalline reaction product is obtained from 2-aminoanthraquinone and a product crystallizing in the form of long red-violet needles from 1-amino-4-benzoylaminoanthraquinone. Similar products are obtained from 1-amino-5-benzoylaminoanthraquinone, 1-amino-4-methoxyanthraquinone, 2,6-diaminoanthraquinone and 1,4- or 1,5-diaminoanthraquinone.

Example 2

A mixture of 58 parts of ms-chlor-2,3-phthaloylquinoline, 44 parts of 2-aminoanthraquinone and 1000 parts of nitrobenzene is boiled until no more hydrochloric acid gas is evolved. After cooling the reaction product is filtered off by suction, washed with ethyl alcohol and crystallized from nitrobenzene. A yellow crystal powder having a melting point of above 360° C. is obtained which dissolves in concentrated sulphuric acid giving an orange-red coloration and yields reddish yellow dyeings of very good fastness properties on cotton from a black-green vat.

If ms-chlor-2,3-phthaloyl-7-chlorquinoline or ms-chlor-2,3-phthaloyl-7-methylquinoline be employed instead of ms-chlor-2,3-phthaloylquinoline, dyestuffs which yield pure yellow dyeings from the vat are obtained. Dyestuffs having similar properties are obtained by employing for example 2,6-diaminoanthraquinone, 1,4- or 1,5-diaminoanthraquinone, 1-aminoanthraquinone, 1-amino-4-benzoylaminoanthraquinone, 1-amino-5-benzoylaminoanthraquinone, 1-amino-4-methoxyanthraquinone, or 1,3-diaminoanthraquinone or their derivatives instead of 2-aminoanthraquinone.

Example 3

47 parts of aminodibenzanthrone, 29 parts of ms-chlor-2,3-phthaloylquinoline and 1500 parts of nitrobenzene are boiled until the evolution of hydrochloric acid gas has ceased. After cooling the reaction product is filtered off by suction, washed with ethyl alcohol and dried. It constitutes a grey-black powder which dissolves in concentrated sulphuric acid giving a violet coloration and which dyes cotton grey-black shades from a blue vat.

Instead of ms-chlor-2,3-phthaloylquinoline, its substitution products and homologues, as for example ms-chlor-2,3-phthaloyl-7-chlorquinoline, or ms-chlor-2,3-phthaloyl-7-methylquinoline, may be employed and instead of aminodibenzanthrone, aminoanthanthrone or aminobenzanthrone may be employed.

Example 4

A mixture of 65 parts of anthraquinone-1 (N), 2-acridone, 1000 parts of nitrobenzene and 10 parts of thionyl chloride are heated at 60° C. for from 3 to 4 hours while stirring. Hereby monochlor-anthraquinone-1 (N), 2-acridine is formed. After the said time the temperature is raised to 190° C. and 44 parts of 2-aminoanthraquinone are added. The whole is boiled until hydrochloric acid gas is no longer evolved, allowed to cool, filtered by suction, washed with ethyl alcohol and dried. The reaction product is a blue-violet powder which dissolves in concentrated sulphuric acid giving a blue-violet coloration.

What we claim is:—

1. The process of producing nitrogenous condensation products which comprises condensing a ms-halogenacridine with a polynuclear primary aromatic amine containing at least one cyclic-bound keto group.

2. The process of producing nitrogenous condensation products which comprises condensing a ms-halogenacridine with a polynuclear aromatic compound containing a primary amino group and at least one cyclic-bound keto group.

3. The process of producing nitrogenous condensation products which comprises condensing a ms-chloracridine with a polynuclear primary aromatic amine containing at least one cyclic-bound keto group.

4. The process of producing nitrogenous condensation products which comprises condensing in the presence of an organic diluent a ms-halogenacridine with a polynuclear primary aromatic amine and containing at least one cyclic-bound keto group.

5. The process of producing nitrogenous condensation products which comprises condensing in the presence of a substance containing copper a ms-halogenacridine with a polynuclear primary aromatic amine and containing at least one cyclic-bound keto group.

6. The process of producing nitrogenous condensation products which comprises condensing in the presence of an agent capable of binding acids a ms-halogenacridine with a polynuclear primary aromatic amine containing at least one cyclic-bound keto group.

7. Condensation products corresponding to the general formula

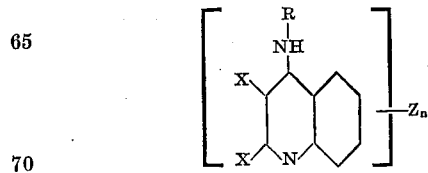

in which R represents a polynuclear aromatic radical in which the amino nitrogen is linked directly to a ring carbon, the said radical containing at least one cyclic-bound keto group, the two positions marked X being occupied by a nuclear grouping selected from the class consisting of

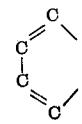

and

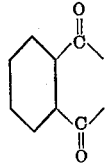

and wherein Z stands for a member selected from the class consisting of hydrogen and halogen, and $n$ for a whole number.

8. Condensation products corresponding to the general formula

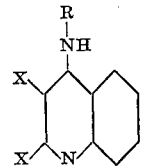

in which R represents a polynuclear aromatic radical in which the amino nitrogen is linked directly to a ring carbon, the said radical containing at least one cyclic-bound keto group, the two positions marked X being occupied by a nuclear grouping selected from the class consisting of

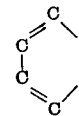

and

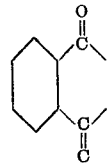

9. Condensation products corresponding to the general formula

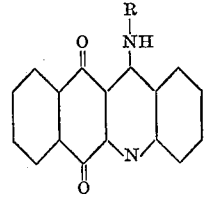

in which R represents a polynuclear aromatic radicle in which the amino nitrogen is linked directly to a ring carbon, the said radicle containing at least one cyclic-bound keto group.

10. Condensation products corresponding to the general formula

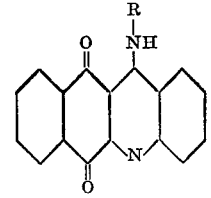

in which R represents a polynuclear aromatic radicle in which the amino nitrogen is linked directly to a ring carbon, the said radicle containing at least one cyclic-bound keto group.
11. Condensation products corresponding to the general formula
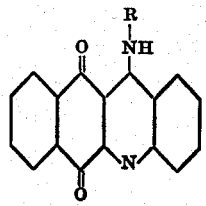
in which R represents the radicle of an anthraquinone.
FRIEDRICH EBEL.
CHRISTIAN STEIGERWALD.